United States Patent
Weisshaar

[19]

[11] Patent Number: 5,954,314
[45] Date of Patent: Sep. 21, 1999

[54] BRACKET-TYPE SPRING VICE

[75] Inventor: Angelika Weisshaar, Villingen-Schwenningen, Germany

[73] Assignee: Klann Tools Ltd., Oxfordshire, United Kingdom

[21] Appl. No.: 08/903,073

[22] Filed: Jul. 30, 1997

[30] Foreign Application Priority Data

Aug. 3, 1996 [DE] Germany ............................ 196 31 524

[51] Int. Cl.$^6$ ...................................................... B60P 1/48
[52] U.S. Cl. ............................................. 254/10.5; 29/227
[58] Field of Search ............................. 254/10.5; 29/225, 29/227; 269/207, 212, 215

[56] References Cited

U.S. PATENT DOCUMENTS 4,872,645  10/1989  Dossier .

FOREIGN PATENT DOCUMENTS

| 0 115 774 A1 | 8/1984 | European Pat. Off. . |
| 0 299 880 A1 | 1/1989 | European Pat. Off. . |
| 33 35 979 C1 | 3/1985 | Germany . |
| 38 23 041 C1 | 10/1989 | Germany . |

*Primary Examiner*—Robert C. Watson
*Attorney, Agent, or Firm*—McGlew and Tuttle, P.C.

[57] ABSTRACT

A spring vice (1) compression springs (31), comprising a spindle drive with a threaded spindle and two tensioning claws (2, 17) of an approximately fork-shaped design, wherein the tensioning claws (2, 17) can be moved toward each other by actuating the threaded spindle. To make it possible to apply strong tensioning forces for tensioning compression coil springs and to guarantee a simple exchangeability of the tensioning claws (2, 17) at the same time, the two tensioning claws (2, 17) are provided with a mounting cylinder (3, 16), which forms a kind of bayonet catch together with the spindle drive. This bayonet catch is optimally suitable for absorbing strong tensioning forces and permits a simple replacement of tensioning claws (2, 17) without problems.

16 Claims, 6 Drawing Sheets

BRACKET-TYPE SPRING VICE

FIELD OF THE INVENTION

The present invention pertains to a spring vice, especially for tensioning coil springs of motor vehicles, comprising a guide tube with a threaded spindle mounted rotatably therein and two tensioning claws of an approximately fork-shaped design, wherein one tensioning claw is fastened axially stationarily at one end of the guide tube via a mounting cylinder, and the second tensioning claw is guided on the guide tube axially displaceably via a guide cylinder, which is in functional connection with at least one radial finger engaging the threaded spindle via internal threads for axially displacing the tensioning claw.

BACKGROUND OF THE INVENTION

A spring vice of this type has been known (U.S. Pat. No. 4,872,645), which has a guide tube in which a threaded spindle is rotatably mounted. To mount the threaded spindle in the area of one of its ends, a bearing bush is provided at the corresponding end of the guide tube. The bearing bush is screwed onto the end of the guide tube and is secured thereon against rotation by means of a grooved pin. This bearing bush has a recessed through hole with an inwardly directed bearing web, which acts as a bearing ring of a thrust bearing. A supporting cylinder, which forms the second bearing ring of the thrust bearing, is screwed onto the threaded spindle or to the end of the threaded spindle. The bearing bush screwed onto one end of the guide tube has on the outside a radially outwardly projecting bearing web, which is directed toward the guide tube and acts as a stop for a tensioning claw that can be mounted on the bearing bush in a firmly seated manner. To mount the tensioning claw on the bearing bush, the tensioning claw is provided with a mounting cylinder, with the mounting hole of which the tensioning claw can be pushed over the bearing bush until it comes into contact with the circular bearing web of the bearing bush. To fix the angular position of the tensioning claw in relation to the bearing bush and conseqently in relation to the guide tube, a fastening screw is provided, which passes radially through the mounting cylinder and is screwed into a threaded hole of the bearing bush. To absorb the strong axial forces occurring during the tensioning of a coil spring, the mounting cylinder is axially stationarily fixed on the bearing bush by means of a threaded ring. The bearing bush is provided for this purpose with a corresponding external thread at an axially spaced location from its bearing web, and the said external thread projects as part of the bearing bush in the axial direction over the mounting cylinder of the tensioning claw, which mounting cylinder is mounted on the bearing bush.

To tension a coil spring, a second tensioning claw is provided, which has a guide cylinder, with which this tensioning claw is mounted on the guide tube axially displaceably. The guide tube has a longitudinal slot, which is open on one side at the end of the guide tube located opposite the bearing bush and through which a radial finger projects radially from the inside and projects beyond the guide tube radially in the outwardly direction. The radial finger is part of a threaded bush, which engages the threaded spindle and is guided axially displaceably with a slight clearance inside the guide tube, The radial finger is in functional connection with the guide cylinder of the second tensioning claw, so that the radial finger is adjustable in the axial direction during the actuation of the threaded spindle via the threaded bush, and the guide cylinder is axially displaced on the guide tube during this adjustment process. The guide cylinder has a receiving groove, which extends axially in a wedge-shaped manner and into which the radial finger of the threaded bush fittingly penetrates in the mounted state of the guide cylinder on the guide tube and it engages the said guide tube in a nearly clearance-free manner. The guide cylinder is pushed over the guide tube during mounting from the side opposite the bearing bush and has a threaded section projecting over the receiving groove toward the first tensioning claw. To secure the guide cylinder axially at the radial finger, a second threaded ring is provided, which is screwed onto the threaded section of the guide cylinder and absorbs the axial forces applied by the radial finger during the tensioning of a compression coil spring between the two tensioning claws. To actuate the threaded spindle, the said threaded spindle has a drive hexagon at its end located opposite the bearing bush, and the said drive hexagon is attached to the end of the threaded spindle located opposite the bearing bush and is fixed on the threaded spindle by means of a locking pin. To mount the threaded spindle in the area of its drive hexagon, which is arranged on the threaded spindle axially outside the guide tube, a cover is provided, which is inserted centered into the guide tube with a guide section and is held in the guide tube by means of a locking pin.

Exchangeability of the tensioning claws for adaptation to compression coil springs of different sizes is guaranteed due to the manner of fastening of the two tensioning claws with their mounting cylinder and guide cylinder on the bearing bush and at the radial finger, respectively, by means of the threaded rings. However, the replacement of the tensioning claws is relatively complicated. Furthermore, only relatively weak axial forces can be applied for tensioning compression coil springs due to the threaded rings provided for fastening the tensioning claws at the guide tube and at the radial finger, because the thread of the threaded rings breaks out under higher loads, especially in the case of axial forces exceeding 5,000 N. Moreover, replacement is rather complicated, because the screw connections must be loosened for replacing the tensioning claws. Since contamination is always present during use in workshops, there always is a risk of damage to the threaded connections between the mounting cylinder or the guide cylinder and the threaded rings, so that this also weakens the threaded connection. This weakening of the threaded connection facilitates the breaking out of the threaded connection, so that the maximum possible tensioning forces for tensioning a coil compression spring are reduced. In addition, the manufacturing costs are very high because of the complicated design of the prior-art spring vice.

SUMMARY AND OBJECTS OF THE INVENTION

Consequently, the primary object of the present invention is to improve a spring vice of this type such that the tensioning claws can be replaced in a simple manner and strong tensioning forces can be applied for tensioning compression coil springs, and a simple and inexpensive design shall also be guaranteed at the same time.

According to the invention, A spring vice, for tensioning coil springs of motor vehicles, is provided comprising a guide tube with a threaded spindle mounted rotatably therein and two tensioning claws of an approximately fork-shaped design. One tensioning claw is fastened axially stationarily at one end of the guide tube via a mounting cylinder and the second tensioning claw is guided axially displaceably on the guide tube via a guide cylinder. The guide cylinder is in functional connection with at least one radial finger engaging the threaded spindle via an internal thread for axially displacing the tensioning claw. The mounting cylinder of the first tensioning claw has a mounting hole with at least one axially extending recess. The mounting cylinder can be pushed up to a stop web of the said guide tube in a mounting angular position over at least one holding section and can be rotated for a firmly seated holding on the end of the guide tube from its mounting angular position into an angular position for use on the guide tube. The guide cylinder of the second tensioning claw has a guide hole with an axially extending recess, which opens into a circular radial groove of the guide hole. The guide cylinder can be pushed in a mounting angular position with its recess over the radial finger, which radially projects over or out of the guide tube and engages the threaded spindle via the internal thread and can be brought from its mounting angular position into an angular position for use by rotation on the guide tube to engage the radial groove of the guide hole.

According to another aspect of the invention, a spring vice, especially for tensioning coil springs of motor vehicles, is provided comprising a guide tube with a threaded spindle mounted rotatably therein and two tensioning claws of an approximately fork-shaped design. One tensioning claw is fastened axially stationarily at one end of the guide tube via a mounting cylinder and the second tensioning claw is guided axially displaceably on the guide tube via a guide cylinder. The guide cylinder is in functional connection with at least one radial finger engaging an external thread of the threaded spindle via an internal thread for axially displacing the tensioning claw. The mounting cylinder of the first tensioning claw is provided with a mounting hole with at least one axially extending recess and can be pushed up to a stop web of the guide tube in a mounting angular position via or over at least one holding section of the guide tube and can be rotated into an angular position for use on the guide tube from its mounting angular position for firmly seated holding at the end of the guide tube. A guide sleeve is provided disposed axially displaceably on the guide tube and has at least one radially projecting holding section for receiving the guide cylinder of the second tensioning claw. The guide sleeve also engages the radial finger in a positive-locking manner. The guide cylinder, with at least one recess of its guide hole, can be pushed for mounting onto on the guide sleeve over the holding section against a stop web of the guide sleeve in a mounting angular position. The guide cylinder can be rotated in relation to the guide sleeve from its mounting angular position into an angular position for use for axial fixation onto the guide sleeve.

Due to the design according to the present invention of the connection between the tensioning claws, on the one hand, and the guide tube and the radial finger, on the other hand, extremely strong tensioning forces far exceeding 10,000 N to at least 20,000 N can be applied by the spring vice according to the present invention. Furthermore, simple exchangeability of the tensioning claws at the guide tube is guaranteed for tensioning compression coil springs of different sizes. The connections between the tensioning claws and the guide tube are designed in the manner of a bayonet catch, so that the tensioning claws can be fastened at the guide tube by a simple rotary movement of the tensioning claws in relation to the guide tube and be again loosened.

According to the embodiments of the invention, the tensioning claw, which is firmly seated on the guide tube of the spring vice at one of its ends during use, is provided with a mounting cylinder, which has a mounting hole with at least one axially continuous recess. A circular stop web, up to which the first tensioning claw can be pushed with its mounting cylinder onto the guide tube, is provided at a spaced location from one end of the guide cylinder for the firmly seated mounting of the said mounting cylinder of the first tensioning claw. At an axially spaced location from this stop web, the guide tube has at its end at least one radially projecting holding section, whose dimensions are coordinated with the recess of the mounting cylinder of the tensioning claw. Thus, to mount the first tensioning claw, the latter can be pushed with the recess of its mounting hole of the mounting cylinder over the holding section in a mounting angular position until the mounting cylinder comes into contact with the stop web of the guide tube. In this position, in which the mounting cylinder is fittingly accommodated exactly between the holding section and the stop web, the tensioning claw with its mounting cylinder can be rotated into an angular position for use from its mounting angular position in relation to the guide tube. The angle of rotation between the mounting angular position and the angular position for use may be preferably about 90°. Other angles of rotation may be provided as well. This difference in angles between the mounting angular position and the angular position for use depends essentially on the circumferential length and the number of recesses of the mounting hole of the mounting cylinder and on the corresponding circumferential length and the number of the holding sections of the guide tube.

To engage the second tensioning claw with the radial finger, the guide cylinder of the second tensioning claw is provided according to one variant of the present invention with a guide hole, which has an axially extending recess, which in turn opens into a circular radial groove of the guide hole. During the mounting of the second tensioning claw at the guide tube and at the radial finger, the guide cylinder of the second tensioning claw with the recess is pushed over the guide tube at a mounting angular position such that the recess will slide over the radial finger until the latter is arranged in the area of the radial groove of the guide hole. By rotating the second tensioning claw with its guide cylinder in relation to the guide tube from the mounting angular position into an angular position for use, the radial finger enters the radial groove of the guide hole, so that the radial finger can be brought into a positive-locking axial connection with the guide cylinder via the radial groove. Due to this positive-locking axial connection, the radial finger can be moved axially in relation to the guide tube and the second tensioning claw can consequently also be moved during the actuation of the threaded spindle.

The design according to a second solution variant of the present invention provides fastening of the first tensioning claw in the manner of fastening according to the first variant of the invention. The fastening of the second tensioning claw at the guide tube differs from the manner of fastening of the first tensioning claw by an additional guide sleeve being provided on the guide tube for receiving the guide cylinder of the second tensioning claw. This guide sleeve has a stop web, against which the second tensioning claw can be pushed on the guide sleeve. At a spaced location from this stop web, the guide sleeve is provided with a radially projecting holding section, over which the guide cylinder can be pushed with a correspondingly designed recess up to the stop web in a corresponding mounting angular position. By rotating the tensioning claw or the guide cylinder of the tensioning claw in relation to the guide sleeve from its mounting angular position into an angular position for use, the guide cylinder is axially fixed in relation to the guide sleeve. The guide sleeve in turn, which is displaceably mounted on the guide tube, engages the radial finger in a positive-locking manner, so that an axial adjustment of the radial finger and consequently of the guide sleeve is brought about by actuating the threaded spindle, and this axial adjustment also brings about an axial adjustment of the second tensioning claw at the same time. A considerable reduction in the contact pressure between the radial finger of the threaded spindle and the guide sleeve can be achieved due to the intended additional guide sleeve, because the radial finger is accommodated in a correspondingly shape-adapted recess of the guide sleeve.

Provisions are also made for providing a threaded bush with two or more radial fingers, so that the contact pressure between the radial fingers and the guide sleeve or between the radial fingers and the guide cylinder of the second tensioning claw can be kept extremely low, so that extremely strong tensioning forces exceeding even 20,000 N can be applied by the spring vice according to the present invention for tensioning a compression coil spring, without the radial finger or radial fingers or even the guide sleeve or the guide cylinder being able to be damaged.

The spring vice according to the present invention represents a spring vice which can be handled in a very simple manner and whose tensioning claws can be replaced in a very simple manner with the bayonet connections designed in the manner of a bayonet catch between the tensioning claws and the guide tube, the radial finger and the guide sleeve. The manufacturing costs of the spring vice according to the present invention are also kept extremely low due to the especially simple design of the bayonet connections, and tensioning forces of up to at least 10,000 N and more can be applied for tensioning compression coil springs.

Extremely high loadability of the tensioning claw is achieved due to the one-piece design of the tensioning claws with the corresponding mounting cylinder and guide cylinder, respectively, so that strong tensioning forces can also be absorbed by the tensioning claw with certainty. Furthermore, the tensioning claws can be manufactured at a low cost.

Another design feature ensures that the tensioning claws cannot unintentionally rotate from their use position on the guide tube, so that safe handling of the spring vice according to the present invention is guaranteed.

Handling during the replacement of the tensioning claws of the spring vice according to the present invention is considerably facilitated by the design of the locking connections between the mounting cylinder, the guide cylinder and the respective associated guide tube, radial finger and guide sleeve.

Instead of a locking connection, a positive-locking connection in the form of a fastening screw, which is screwed radially through the mounting cylinder and the guide cylinder, may be provided as well; this fastening screw engages a corresponding mounting hole of the guide tube, of the radial finger or of the guide sleeve to secure the position of the tensioning claws in their angular position for use. To replace the tensioning claws, this fastening screw is to be screwed radially outwardly from the mounting cylinder or the guide cylinder only to the extent that the fastening screw no longer engages the corresponding mounting hole, so that the mounting cylinder or the fastening cylinder can be brought freely rotatably into its corresponding mounting angular position and can be removed.

Due to the ring segment-like design of the holding web or holding webs, extremely low contact pressures can be obtained between the mounting cylinder or the guide cylinder of the respective tensioning claws and the associated holding web, so that the connection between the mounting cylinder or the guide cylinder and the guide tube or the guide sleeve can be subjected to especially high loads.

Due to another design feature, jamming of the mounting cylinder on the guide cylinder or of the guide cylinder on the guide sleeve is prevented with certainty, so that the tensioning claws can always be reliably rotated from their angular position for use into their corresponding mounting angular position for removal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figures 1, 2:
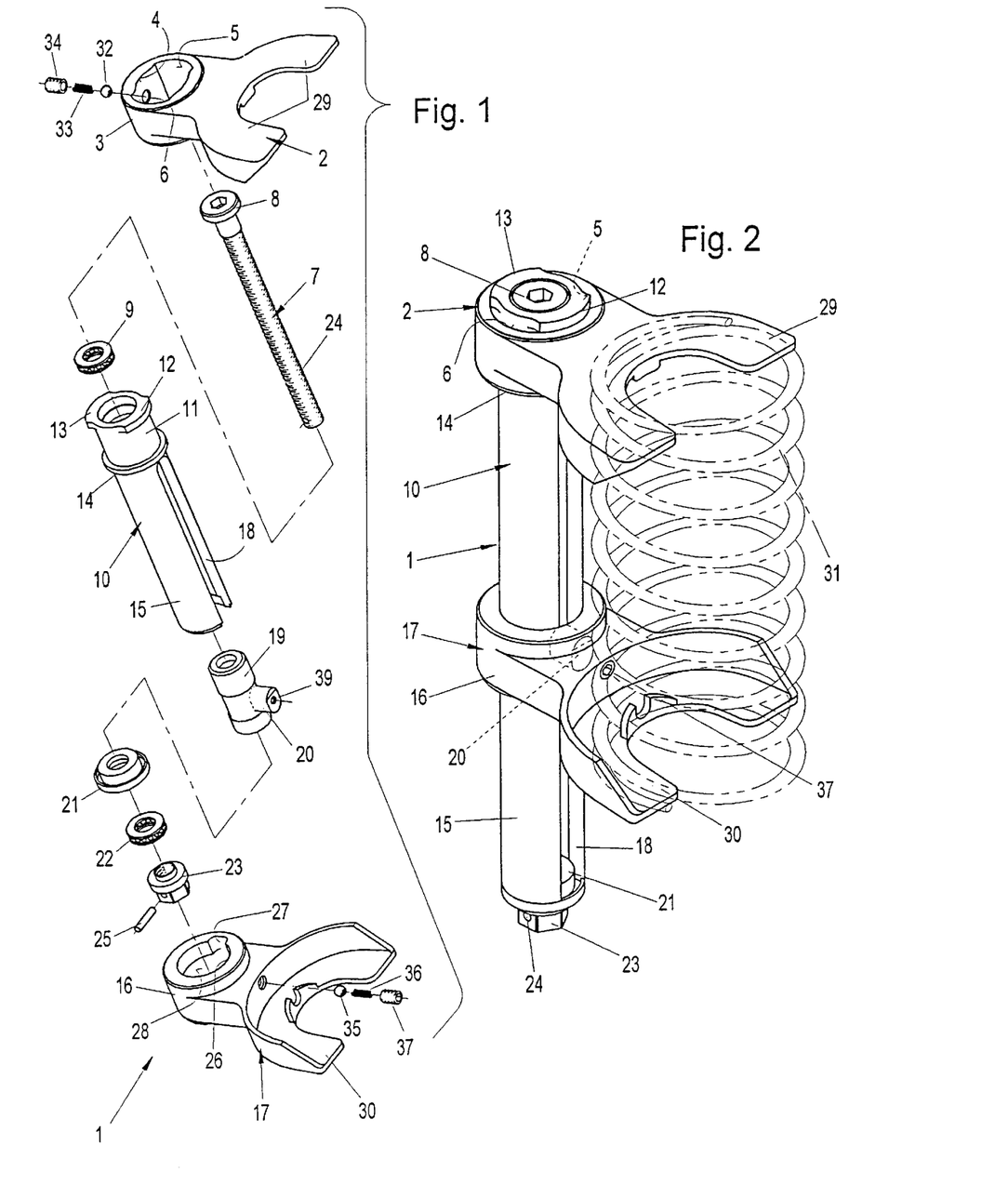
FIG. 1 is a perspective exploded view of the essential components of a spring vice according to the present invention.
FIG. 2 is a spring vice according to the present invention in the assembled state.

Referring to the only drawing in particular, the invention comprises a bracket-type spring vice. FIG. 1 shows a perspective exploded view of the individual components of a spring vice 1 according to the present invention. The spring vice 1 has a first tensioning claw 2, which is provided with a mounting cylinder 3. A mounting hole 4, which has two diametrically opposite recesses 5 and 6, is provided in the mounting cylinder 3. The two recesses 5 and 6 extend over a centering angle of about 90° in this exemplary embodiment.

A threaded spindle 7 is also provided, which is equipped at one of its ends with a radially expanded stop collar 8, with which the threaded spindle 7 is mounted in a guide tube 10 of the spring vice 1 via a thrust bearing 9 in the assembled state. The guide tube 10 is provided at one of its ends with a receiving section 11, which has two diametrically opposite, radially projecting holding sections in the form of holding webs 12 and 13 at the axially outer end of the guide tube 10. The shape and size of these holding webs are adapted to the recesses 5 and 6 of the mounting hole 4 of the mounting cylinder 3 such that the mounting cylinder 3 can be pushed over or via the holding webs 12 and 13 of the guide tube with its mounting hole 4 and with its recesses 5 and 6 in a mounting angular position. The diameter of the mounting hole 4 is adapted to the receiving section 11 of the guide tube 10, so that the tensioning claw 2 seated on the receiving section 11 of the guide tube 10 in the mounted state is mounted in a nearly clearance-free manner. The receiving section 11 is limited by a circular stop web 14 at an axially spaced location from the two holding webs 12 and 13, and the axial distance between the stop web 14 and the two holding webs 12 and 13 approximately corresponds to the axial length of the mounting cylinder 3 of the first tensioning claw 2. This stop web 14 or the receiving section 11 of the guide tube is joined by a guide section 15 of the guide tube 10, on which a guide cylinder 16 of a second tensioning claw 17 is displaceably mounted in the mounted state.

In the area of this guide section 15 of the guide tube 10, the guide tube 10 has an axial slot 18, which is designed as a slot open on one side at the end of the guide tube located opposite the receiving section 11 of the guide tube 10.

Furthermore, a threaded bush 19 is provided, which is equipped with a radial finger 20, which passes through the axial slot 18 of the guide tube 10 in the mounted state and projects over same radially. The threaded bush 19 is guided in a nearly clearance-free manner in the guide tube 10 in the mounted state and it is in a functional connection with the threaded spindle, so that the threaded bush 19 is axially movable in the guide tube by actuating the threaded spindle, and the radial finger 20 correspondingly performs an axial movement in the axial slot 18 of the guide tube 10. The guide tube 10 can be closed by means of a bearing cap 21 that can be screwed onto the guide tube 10.

The bearing cap 21 is used to receive a second thrust bearing 22, at which a drive hexagon 23 is supported in the axial direction in the mounted state. The drive hexagon 23 is screwed onto the threaded section 24 of the threaded spindle 7 in the mounted state and is nonrotatably connected to the threaded spindle 7 by means of a grooved pin 25 to transmit torque during the actuation of the threaded spindle 7, wherein the grooved pin 25 is used essentially to transmit a driving torque to actuate the threaded spindle 7 via its drive hexagon 23.

The guide cylinder 16 of the second tensioning claw 17 has a guide hole 26, with which the guide cylinder 16 can be pushed over the guide section 15 of the guide tube 10 fittingly and in a nearly clearance-free manner. The guide hole 26 also has a radial recess 27, which extends axially up to a circular radial groove 28 in the guide hole 26. The dimensions of the recess 27 are coordinated with the radial finger 20, so that the recess 27 can be pushed over the radial finger 20 projecting from the axial slot 18 for mounting the second tensioning claw 17 with its mounting cylinder 16 on the guide section 15 of the guide tube 10 until the radial finger 20 is arranged in the radial groove 28. By rotating the second tensioning claw with its guide cylinder 16, the radial finger 20 can be caused to engage the radial groove 28 in the axial direction in a positive-locking manner, so that the second tensioning claw is axially fixed after the rotation of the tensioning claw 17 in relation to the radial finger 20 and consequently in relation to the guide tube 10. By actuating the threaded spindle 7 via its drive hexagon 23, the threaded bush 19 is pushed with its radial finger 20 in the axial direction in the guide tube 10. Due to the axial displacement of the radial finger 20 in the axial slot 18, the second tensioning claw 17 is at the same time carried in the axial direction via its radial groove 28, which engages the radial finger 20 in a positive-locking manner, so that a relative movement takes place in the mounted state of the second tensioning claw 17 relative to the first tensioning claw 2.

FIG. 2 shows the spring vice 1 according to the present invention in the mounted state. The first tensioning claw 2 is arranged in its angular position for use on the guide tube 10 axially firmly seated between the stop web 14 and the holding sections 12 and 13. In this angular position for use, the recesses 5 and 6 of the mounting hole 4 of the mounting cylinder 3 are arranged at right angles to the holding sections 12 and 13 of the guide tube 10. The length of the mounting cylinder 3 is coordinated with the distance between the holding sections 12 and 13, on the one hand, and the stop web 14, on the other hand, such that the mounting cylinder 3 is seated fittingly between the holding sections 12, 13 and the stop web 14 in the shown angular position for use of the tensioning claw 2 at the guide tube 10 and on the receiving section 11 of the guide tube 10.

The second tensioning claw 17 is seated with its guide cylinder 16 axially displaceably on the guide section 15 of the guide tube 10 and with its radial groove 28, not shown in the drawing, it engages the radial finger 20 of the threaded bush 19, which radial finger is indicated by broken line in FIG. 2, in the axial direction in a positive-locking manner. In this angular position for use of the second tensioning claw 17 at the guide tube 10, the receiving section 27 of the tensioning claw 17 is arranged extending at right angles to the radial finger 20 behind the guide tube 10 and thus it is not visible in FIG. 2. The angular positions for use of the tensioning claws 2 and 17 are coordinated with one another such that they are located axially opposite each other with their receiving forks 29 and 30, so that a compression coil spring 31, represented by phantom lines in FIG. 2, can be accommodated between the receiving forks 29 and 30 of the tensioning claws 2 and 17. The receiving forks 29 and 30 are arranged essentially symmetrically to the axial slot 18 of the guide tube 10.

Figure 3:
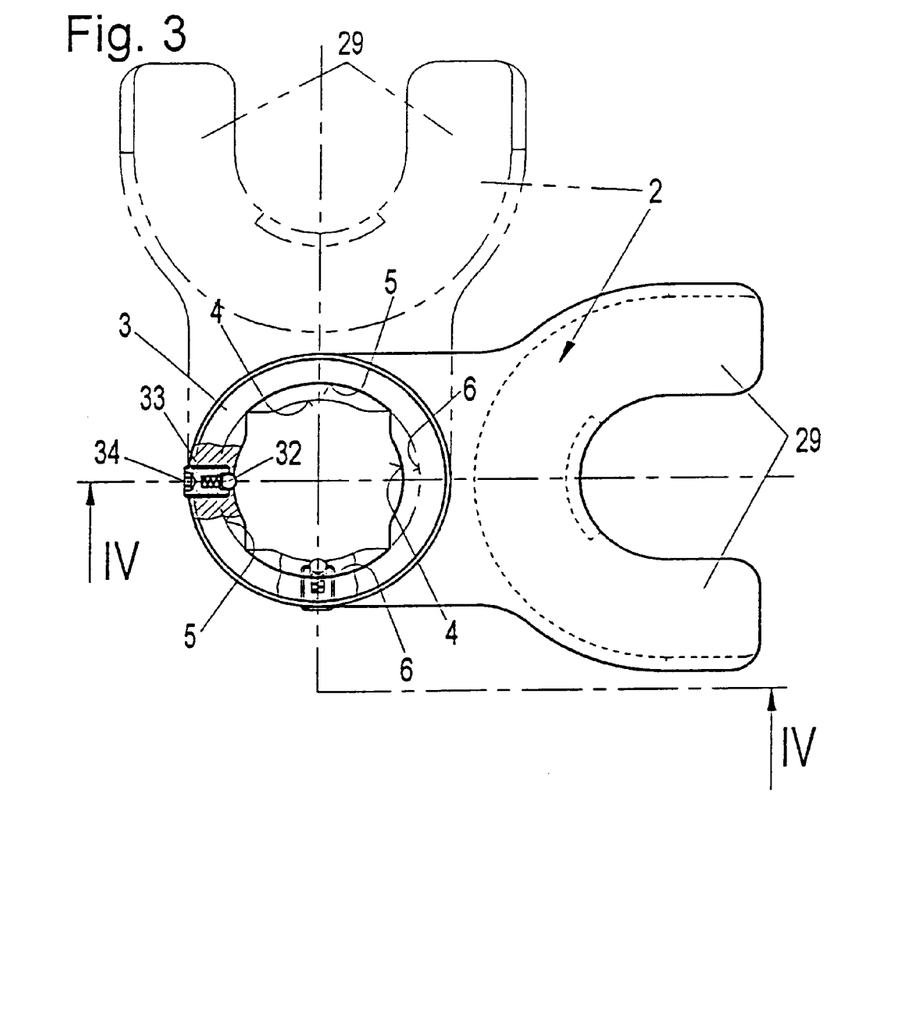
FIG. 3 is a top view of the first tensioning claw of the tensioning claw from FIG. 1.
Figure 4:
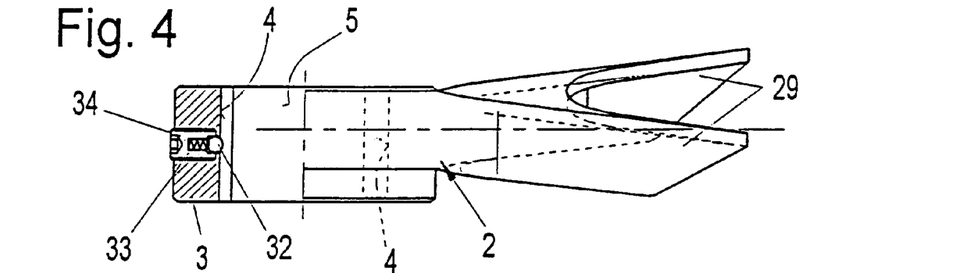
FIG. 4 is a partial section IV—IV from FIG. 3.
Figure 8:
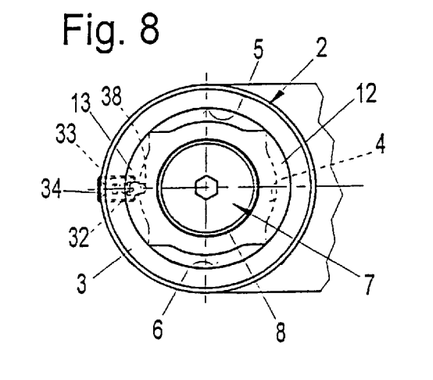
FIG. 8 is a partial view VIII of the spring vice from FIG. 7.

FIG. 3 shows a top view of the first tensioning claw 2, wherein the tensioning claw 2 is shown in two positions. One tensioning claw 2, shown by phantom lines, represents the mounting angular position of the tensioning claw 2 and the normally drawn position represents the angular position for use of the tensioning claw 2 at the guide tube 10, wherein the guide tube 10 with its threaded spindle 7 is not shown in FIG. 3 for clarity's sake. The angular position for use of the tensioning claw 2 at the guide tube 10 is shown in FIG. 8.

In the mounting angular position for use shown by phantom lines in FIG. 3, the tensioning claw 2 with its recesses 5 and 6 of its mounting hole 4 can be pushed onto the holding sections 12 and 13 of the guide tube 10, which are aligned correspondingly in the same direction, until the mounting cylinder 3 of the tensioning claw 2 comes into contact with the stop web 14 of the guide tube. In this axial position on the receiving section 11 of the guide tube 10, the tensioning claw 2 is pivoted from the mounting angular position represented by phantom lines into the angular position for use at the guide tube 10, which is shown rotated by 90° and is drawn normally, so that the tensioning claw 2 with its mounting cylinder 3 is axially fixed between the holding sections 12 and 13 and the stop web 14 of the guide tube 10.

A locking ball 32, which partially extends radially into the mounting hole 4 of the mounting cylinder 3, is provided to fix the tensioning claw 2 in its angular position for use. The locking ball 32 is held pretensioned in its position extending into the mounting hole 4 by means of a coil spring 33. The radial pretension acting on the locking ball 32 is adjustable by means of a tightening screw 34 screwed radially into the mounting cylinder 3 on the outside by screwing the said screw radially into and out of the mounting cylinder 3.

The locking ball 32 with its coil spring 33 and with the tightening screw 34 is located diametrically opposite the receiving fork 29 of the tensioning claw 2 in this exemplary embodiment. This arrangement is, of course, not absolutely necessary and a different arrangement may correspondingly be selected as well.

Figure 5:
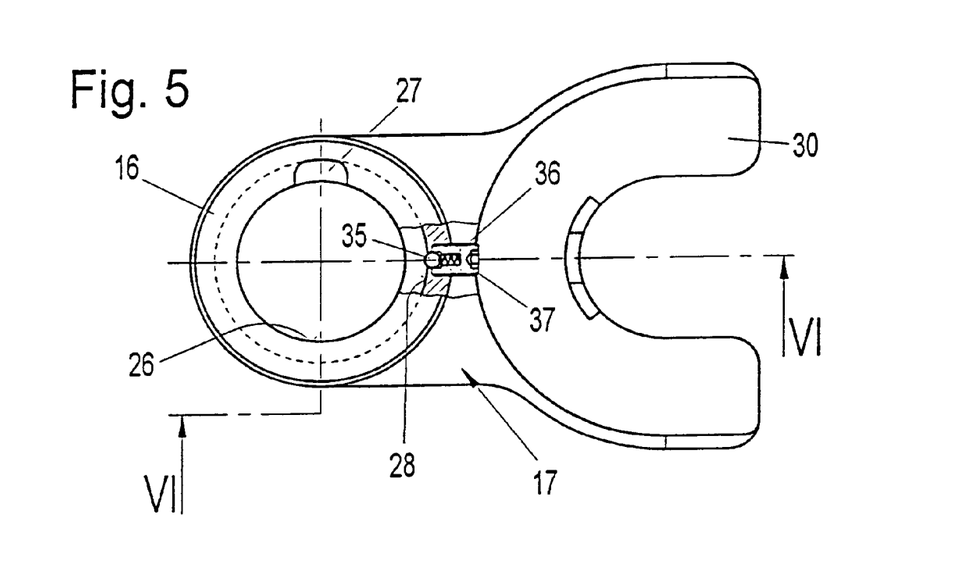
FIG. 5 is a top view of the second tensioning claw of the spring vice from FIG. 1.
Figure 6:
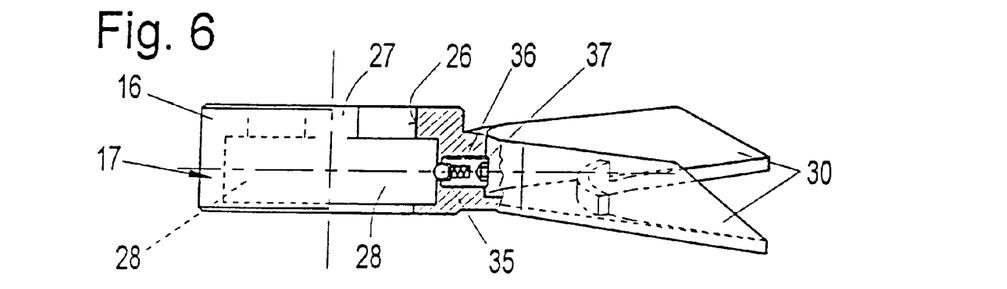
FIG. 6 is a partial section VI—VI from FIG. 5.

FIGS. 5 and 6 show the top view and a partial section, respectively, of the second tensioning claw 17. The recess 27 is arranged at right angles to the receiving fork 30 of the tensioning claw 17 and, as is seen in FIG. 6, it is open toward the top side of the guide cylinder 16 of the tensioning claw 17. The recess 27 opens axially in the downward direction in the radial groove 28 of the guide hole 26. To mount the tensioning claw 17 on the guide tube 10, the tensioning claw 17 with its mounting cylinder 16 is pushed onto the guide tube 10 in a mounting angular position in which the guide cylinder 16 with its recess 27 can be pushed over the radial finger 20 of the threaded bush 19 until the radial finger 20 comes axially into contact with the lower limiting edge of the radial groove 28 of the guide cylinder 16. The height of the radial groove 28 is coordinated with the dimensions of the radial finger 20 such that the tensioning claw 17 on the guide tube 10 can be rotated by about 90° from its mounting angular position into an angular position for use and the radial finger 20 is accommodated in the radial groove 28, as is shown in FIG. 7, in a nearly clearance-free manner.

Figure 7:
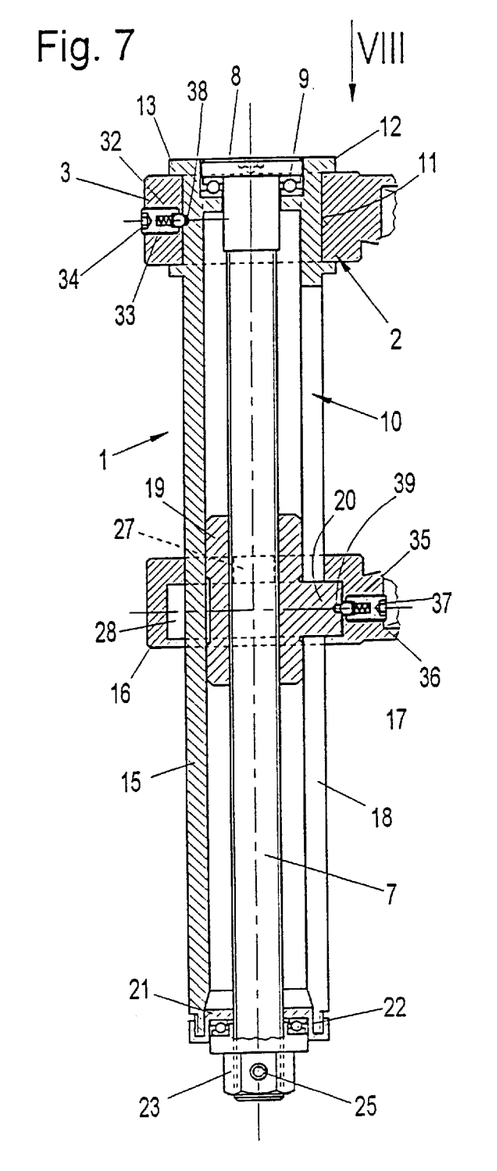
FIG. 7 is a vertical partial section through the spring vice from FIG. 1.

A locking ball 35, which is arranged radially in the guide cylinder 16 approximately in the area of the axial middle of the radial groove 28, is provided in the guide cylinder 16 of the tensioning claw 17 to fix the angular position for use shown in FIG. 7. The locking ball 35 penetrates minimally with a partial area into the radial groove 28 of the guide cylinder 16. A coil spring 36, whose pretension can be adjusted by means of a tightening screw 37, is also provided for the radial pretensioning.

As can be seen in FIGS. 7 and 8, the holding sections 12 and 13 of the guide tube 10 are in contact with the top side of the mounting cylinder 3 of the tensioning claw 2 in the angular position for use of the tensioning claw 2 at the guide tube 10 that is shown in these representations. On the underside, the mounting cylinder 3 is in contact with the stop web 14 of the guide tube 10, so that the mounting cylinder 3 is fittingly accommodated between the holding sections 12 and 13 and the stop web 14, and it is arranged on the receiving section 11 of the guide tube 10 in a nearly clearance-free manner. In the shown angular position for use of the tensioning claw 2 on the receiving section 11 of the guide tube 10, the locking ball 32 engages, pretensioned, a corresponding locking hole 38 in the area of the receiving section 11 in a positive-locking manner, so that the angular position for use of the tensioning claw 2 is secured.

The pretensioning forces of the coil spring 33 are selected or are adjustable such that the tensioning claw 2 is held securely in its angular position for use during use, and to remove the tensioning claw 2, the latter can be brought manually into the mounting angular position shown in FIG. 3, which is rotated by 90° in relation to the angular position for use, in relation to the guide tube 10 against the said locking or clamping forces of the locking ball 32 in the locking hole 38. The tensioning claw 2 with its mounting cylinder 3 and with the recesses 5 and 6 of its mounting hole 4 can thus be pushed in the mounting angular position over the two holding sections 12 and 13 and can be replaced with a tensioning claw of a different size in a simple manner. Instead of the locking means provided by the locking ball 32 and the locking hole 38, it is also possible to provide a locking means of another design for fixing the angular position for use of the tensioning claw 2 at the guide tube 10 at any time.

As is apparent from FIG. 7, a locking hole 39, which is lockingly engaged by the locking ball 35 under pretension in the angular position for use of the tensioning claw 17 at the guide tube 10, is also provided in the radial finger 20 of the threaded bush 19. To remove the tensioning claw 17, the latter is rotated on the guide tube by about 90° until it comes to lie with its recess 27 above the radial finger 20 of the threaded bush 19. The tensioning claw 17 can be removed from the guide tube 10 in a simple manner in this mounting angular position rotated by 90° by displacing it downward in the axial direction and it is axially movable with its recess 27 over the radial finger 20. The pretension of the coil spring 36 can be adjusted in the same manner as the pretension of the coil spring 33 of the tensioning claw 2, so that the setting of the angular position for use cannot be unintentionally changed during use, on the one hand, and, on the other hand, a rotation of the tensioning claw 17 manually from its angular position for use into its mounting angular position can be performed with certainty. To adjust these locking forces, the tightening screw 37 is correspondingly provided, which is screwed, radially adjustably, into the guide cylinder 16 of the tensioning claw 17.

Figure 9:
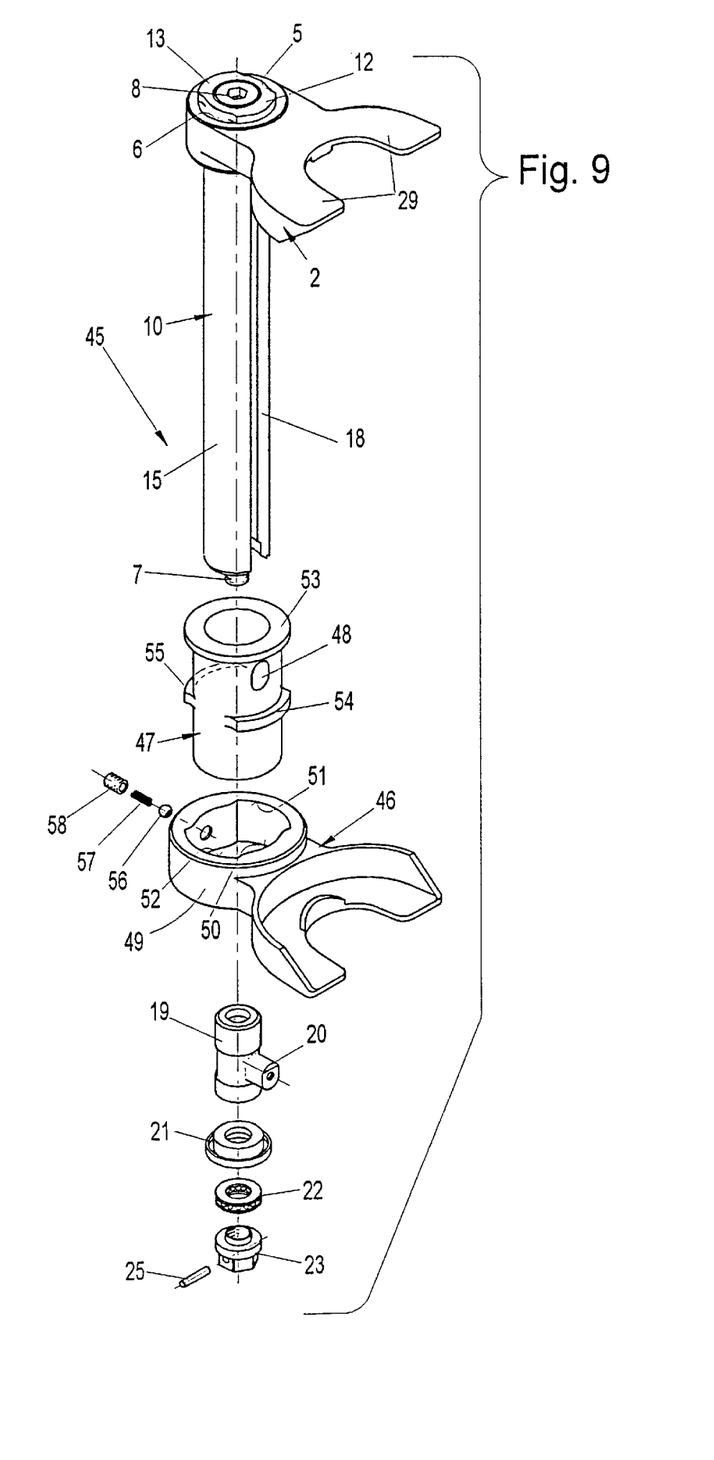
FIG. 9 is a perspective exploded view of the components of a second exemplary embodiment of a spring vice according to the present invention.
Figure 10:
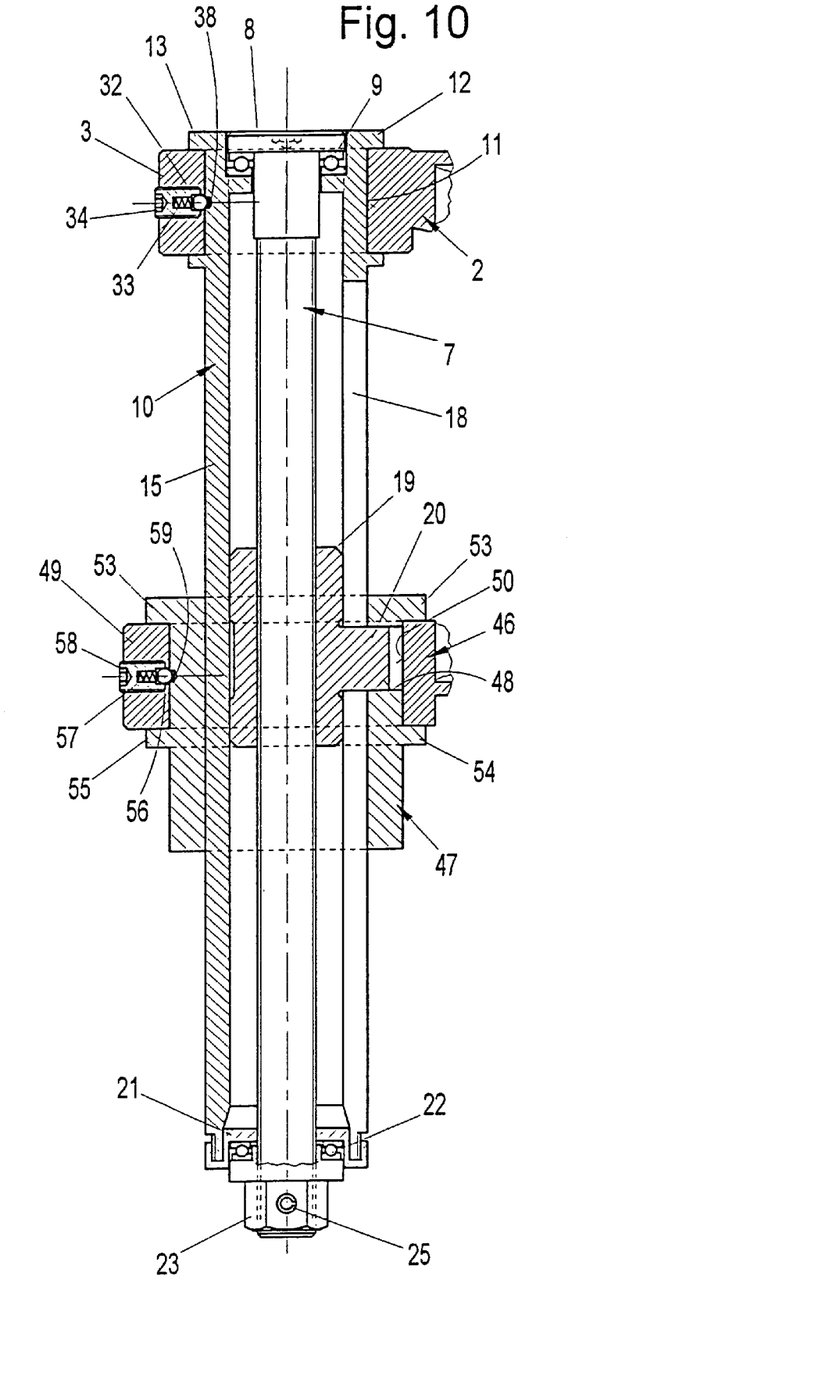
FIG. 10 is a longitudinal section of the spring vice from FIG. 9.

FIGS. 9 and 10 show a second exemplary embodiment 45 of a spring vice according to the present invention, whose first tensioning claw 2, seated firmly at one end of the guide tube 10, the threaded spindle with its stop collar 8, the threaded bush 19 with the radial finger 20, as well as the bearing cap 21, the thrust bearing 22 and the drive hexagon 23 with the grooved pin 25 have the same designs as in the exemplary embodiment of the spring vice 1. The threaded spindle 7 is mounted in the guide tube 10 in FIG. 9, and the tensioning claw is arranged mounted firmly seated at the top end of the guide tube 10. The reference numbers correspond to those in FIGS. 1 through 8.

Thus, the tensioning claw 2 is also arranged correspondingly at the guide tube 10 on a corresponding receiving section 11. For fixing, holding sections 12 and 13 are likewise provided at the guide tube 10 and a stop web 14 is provided. The tensioning claw 2 is likewise provided with radial recesses 5 and 6 of its mounting hole 4, so that it can be pushed onto the guide tube 10 in a mounting angular position over the receiving sections 12 and 13 of the guide tube 10 into the axial position shown.

By rotating by 90° into the angular position for use shown in FIG. 9, the tensioning claw 2 is then held axially non-displaceably between the holding sections 12 and 13 and the stop web 14 at the guide tube 10.

To exchangeably fix the second tensioning claw 46, an additional guide sleeve 47 is provided, which can be pushed onto the guide tube 10 in a clearance-free manner. As is apparent from FIGS. 9 and 10, the guide sleeve is provided with a radial opening 48, which is engaged by the radial finger 20 of the threaded bush 19 in a nearly clearance-free manner in the mounted state (FIG. 10).

The tensioning claw 46 has a guide cylinder 49 with a guide hole 50, which is provided with two diametrically opposite, axially continuous recesses 51 and 52. To receive the tensioning claw 46 with its guide cylinder 49 and to fix the guide cylinder 49 axially on the guide sleeve 47, the guide sleeve 47 is provided at its top end with a radially projecting stop web 53, with which the tensioning claw 46 is in contact with its guide cylinder 49, as is shown in FIG. 10. Furthemore, diametrically opposite holding sections in the form of holding webs 54 and 55, whose dimensions are selected such that the tensioning claw 46 can be pushed in a mounting angular position over these holding sections 54 and 55 of the guide sleeve 47 into the end position shown in FIG. 10, are provided at the guide sleeve 47 at an axially spaced location from stop web 53 on the guide sleeve 47. By rotating the tensioning claw 46 in relation to the guide sleeve 47 by about 90° from its mounting angular position into an angular position for use shown in FIG. 10, the tensioning claw 46 is accommodated between the holding webs 54 and 55 and the circular stop web 53 with a small axial clearance.

To fix the angular position for use of the tensioning claw 46 in relation to the guide sleeve 47, a locking ball 56 is provided, which extends into the mounting hole of the guide cylinder 49 of the tensioning claw 46. To apply a radial pretensioning force to the locking ball 56, a coil spring 57 with a tightening screw 58 is provided, and the pretension can be adjusted by means of the tightening screw 58 in the same manner as can the pretension of the locking balls 32 and 35. The locking ball 56 engages a locking hole 59 of the guide sleeve 47 in the mounted state, so that the angular position for use of the tensioning claw 46 in relation to the guide hole 47 is fixed in this angular position for use by the locking ball 56 and the locking hole 59 during the use of the spring vice 45. Manual rotation in relation to the locking forces of this locking connection is possible at any time, so that the tensioning claw 46 can be adjusted to its mounting angular position in a simple manner and it can be replaced in a correspondingly simple manner.

Due to the design of the spring vice according to the present invention, especially of its connection elements between the guide tube and the tensioning claws, a spring vice is provided with which extremely strong tensioning forces can be applied to a compression coil spring, which may be in the range of up to 20,000 N. At the same time, the tensioning claws can be replaced in a very simple manner due to the connections between the guide tube and the tensioning claws, which are designed in the manner of a bayonet catch. It is thus possible to tension motor vehicle compression coil springs of different sizes and tensioning forces with the spring vice according to the present invention.

While specific embodiments of the invention have been shown and described in detail to illustrate the application of the principles of the invention, it will be understood that the invention may be embodied otherwise without departing from such principles.

What is claimed is:

1. A spring vice for tensioning coil springs of motor vehicles, the vice comprising:

a guide tube with a holding section and a stop web;

a threaded spindle mounted rotatable in said guide tube;

a radial finger threadingly engaged with said threaded spindle for axial displacement along said guide tube, said radial finger extending radially outward from said guide tube;

a first tensioning claw of an approximately fork-shaped design, said first tensioning claw including a mounting cylinder defining a mounting hole, said mounting cylinder also defining an axially extending recess in said mounting hole, said mounting cylinder being movable over said holding section of said guide tube to a position adjacent to said stop web of said guide tube in a mounting angular position, said mounting cylinder being rotatable from said mounting angular position to an angular position for use on said guide tube for a firmly seated holding to an end of said guide tube;

a second tensioning claw of an approximately fork-shaped design, said second tensioning claw including a guide cylinder defining a guide hole having an axially extending recess in communication with a circular radial groove of said guide hole, said guide cylinder being movable onto said radial finger with said radial finger passing through said axially extending recess opening, said guide cylinder being rotatable on said radial finger with said radial finger passing through said radial groove from a mounting angular position to an angular position for use.

2. A vice in accordance with claim 1, wherein:

in said angular position of use, said radial finger and said radial groove axially lock said radial finger and said second tension claw together for axial movement of both said radial finger and said second tension claw along said guide tube, said axial movement being caused by rotation of said threaded spindle.

3. The spring vice in accordance with claim 1, wherein:

each of said first and second tensioning claws and corresponding mounting cylinder or said guide cylinder are made in one piece.

4. The spring vice in accordance with claim 1, wherein said angular position for use of said first and second tensioning claws is fixed relative to said guide tube via a corresponding said mounting cylinder and said guide cylinder by a detachable positive-locking connection, including a locking connection between said mounting cylinder and said guide tube and between said guide cylinder and said radial finger.

5. The spring vice in accordance with claim 4, wherein said locking connections are formed by a spring-loaded ball each, said spring-loaded ball being arranged radially extending, together with a respective associated compression coil spring in said mounting cylinder and said guide cylinder of said first and second tensioning claws, each said spring-loaded ball of said locking connection engaging one of a locking hole of said guide tube and said radial finger in said angular position for use.

6. The spring vice in accordance with claim 1, wherein said holding section of said guide tube includes a ring segment-like holding web, said axially extending recess of said mounting cylinder having a dimension to pass said holding web.

7. The spring vice in accordance with claim 1, wherein said mounting cylinder is accommodated in said angular position for use between said respective corresponding holding section and said stop web with just a slight clearance.

8. The spring vice in accordance with claim 1, wherein said radial finger includes an internal thread and is formed as a one-piece part of a threaded bush, said threaded bush is guided axially displaceably in said guide tube with a slight clearance.

9. A spring vice for tensioning coil springs of motor vehicles, the vice comprising:

a guide tube with a holding section and a stop web;

a threaded spindle mounted rotatable in said guide tube;

a radial finger threadingly engaged with said threaded spindle for axial displacement along said guide tube, said radial finger extending radially outward from said guide tube;

a first tensioning claw of an approximately fork-shaped design, said first tensioning claw including a mounting cylinder defining a mounting hole, said mounting cylinder also defining an axially extending recess in said mounting hole, said mounting cylinder being movable over said holding section of said guide tube to a position adjacent to said stop web of said guide tube in a mounting angular position, said mounting cylinder being rotatable from said mounting angular position to an angular position for use on said guide tube for a firmly seated holding to an end of said guide tube;

a guide sleeve mounted axially displaceable on said guide tube, said guide sleeve including positive locking means for positively locking with said radial finger, said guide sleeve having a radially projecting holding section and a stop web;

a second tensioning claw of an approximately fork-shaped design, said second tensioning claw including a guide cylinder defining a guide hole having an axially extending recess, said guide cylinder being movable over said holding section of said guide sleeve to a position adjacent to said stop web of said guide sleeve in a mounting angular position on said guide sleeve, said guide cylinder being rotatable from said mounting angular position on said guide sleeve to an angular position for use on said guide sleeve for a firmly seated holding of said guide cylinder to said guide sleeve.

10. A vice in accordance with claim 9, wherein:

in said angular position of use of said guide cylinder on said guide sleeve, said guide cylinder and said guide sleeve axially lock said radial finger and said second tension claw together for axial movement of both said radial finger and said second tension claw along said guide tube, said axial movement being caused by rotation of said threaded spindle.

11. The spring vice in accordance with claim 9, wherein said first and second tensioning claws and corresponding said mounting cylinder or said guide cylinder are made in one piece.

12. The spring vice in accordance with claim 9, wherein said angular position for use of each of said first and second tensioning claws is fixed relative to said said guide tube via a corresponding said mounting cylinder and said guide cylinder by a respective detachable positive-locking connection, said positive locking connection of said mounting cylinder including a locking connection between said mounting cylinder and said guide tube, and said positive locking connection of said guide cylinder including a connection between said guide cylinder and said guide sleeve.

13. The spring vice in accordance with claim 12, wherein said locking connections are formed by a spring-loaded ball each, said spring-loaded ball being arranged radially extending, together with a respective associated compression coil spring, in said mounting cylinder and said guide cylinder of said first and second tensioning claws, each said spring-loaded ball engaging a locking hole of one of said guide tube and of said guide sleeve in an angular position for use.

14. The spring vice in accordance with claim 9, wherein:

each said holding section of said guide tube and of said guide sleeve is formed by a ring segment-like holding web, said axially extending recess of said mounting cylinder and of said guide cylinder having a dimension to pass respective said holding webs.

15. The spring vice in accordance with claim 9, wherein said mounting cylinder and said guide cylinder are accommodated in respective said angular positions for use in between said respective corresponding holding section and said stop web with a just slight clearance.

16. The spring vice in accordance with claim 9, wherein said radial finger includes an internal thread and is a one-piece part of a threaded bush, said threaded bush is guided axially displaceably in said guide tube with a slight clearance.

* * * * *